United States Patent
Watanabe

(10) Patent No.: US 8,704,989 B2
(45) Date of Patent: Apr. 22, 2014

(54) LIQUID CRYSTAL DISPLAY

(75) Inventor: Yoshihiro Watanabe, Nagano (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 124 days.

(21) Appl. No.: 13/083,208

(22) Filed: Apr. 8, 2011

(65) Prior Publication Data

US 2011/0228204 A1 Sep. 22, 2011

(51) Int. Cl.
*G02F 1/1343* (2006.01)
*G02F 1/1368* (2006.01)

(52) U.S. Cl.
USPC ............ 349/141; 349/43; 349/138; 349/143

(58) Field of Classification Search
USPC ............ 349/42, 43, 122, 123, 139, 141, 143, 349/138; 345/92; 257/59, 72
See application file for complete search history.

(56) References Cited

U.S. PATENT DOCUMENTS

| | | | |
|---|---|---|---|
| 2007/0024789 A1* | 2/2007 | Itou et al. | 349/139 |
| 2007/0177090 A1* | 8/2007 | Shimomaki | 349/141 |
| 2008/0001883 A1* | 1/2008 | Kim et al. | 345/92 |
| 2008/0266479 A1* | 10/2008 | Lim | 349/46 |
| 2009/0231529 A1* | 9/2009 | Aota et al. | 349/123 |

FOREIGN PATENT DOCUMENTS

JP 2008-165134 7/2008

* cited by examiner

*Primary Examiner* — Dung Nguyen
*Assistant Examiner* — Tai Duong
(74) *Attorney, Agent, or Firm* — K&L Gates LLP

(57) ABSTRACT

A liquid crystal display is provided including: a display section including a plurality of pixels, a first substrate and a second substrate which are disposed opposite to each other with liquid crystal therebetween in the display section, pixel electrodes which are provided over one of the first substrate and the second substrate on a pixel basis and which each do not have a slit or opening in plan view, and a common electrode which is formed over the pixel electrodes, with an organic interlayer film composed of an organic film therebetween, and which has a plurality of slits.

10 Claims, 8 Drawing Sheets

LIQUID CRYSTAL DISPLAY

BACKGROUND

The present disclosure relates to a liquid crystal display, particularly to a liquid crystal display of the FFS (Fringe Field Switching) system in which pixel electrodes and a common electrode are formed over one of a pair of substrates.

There has been known a liquid crystal display of the FFS system in which pixel electrodes and a common electrode are formed over one of a pair of substrates (see, for example, Japanese Patent Laid-open No. 2008-165134 referred to as Patent Document 1 hereinafter). In the liquid crystal display disclosed in Patent Document 1, thin film transistors (TFTs) are formed on a substrate, and a gate insulating film composed of an SiN film is formed on the TFTs and the substrate. Over the gate insulating film are formed pixel electrodes, with both an interlayer insulation film composed of an SiN film and an interlayer insulation film composed of an organic layer therebetween. Besides, over the pixel electrodes is formed a common electrode having slits, with an insulation film (inorganic film) composed of an SiN film therebetween.

SUMMARY

In the liquid crystal display described in Patent Document 1, the liquid crystal display of the FFS system in which pixel electrodes and a common electrode are formed over one of a pair of substrates is configured, which is suitable for realizing a wider viewing angle. On the other hand, where an inorganic film such as an SiN film is formed between the common electrode and the pixel electrodes on the substrate, the substrate may be warped due to the tension on the SiN film. Therefore, it is desired to further restrain the warping of the substrate in a liquid crystal display.

Thus, there is a desire for a liquid crystal display such that warping of a substrate in the display can be restrained more assuredly.

According to an embodiment, there is provided a liquid crystal display including: a display section including a plurality of pixels; a first substrate and a second substrate which are disposed opposite to each other with liquid crystal therebetween in the display section; pixel electrodes which are provided over one of the first substrate and the second substrate on a pixel basis and which each do not have a slit or opening in plan view; and a common electrode which is formed over the pixel electrodes, with an organic interlayer film composed of an organic film therebetween, and which has a plurality of slits.

In the liquid crystal display according to the embodiment, as above-mentioned, the common electrode having a plurality of slits is provided over the pixel electrodes, with the organic interlayer film composed of an organic film therebetween. This ensures that, where an organic film is formed between the pixel electrodes on the substrate and the common electrode, warping of the substrate is lessened, since the tension on the organic film is smaller than that on an inorganic film. As a result, suppression of the warping of the substrate in the liquid crystal display can be contrived. In addition, by providing the first substrate and the second substrate disposed opposite to each other with liquid crystal therebetween in the display section, the pixel electrodes being provided over one of the first substrate and the second substrate on a pixel basis and being formed to have no slit or opening therein in plan view, and the common electrode being formed over the pixel electrodes with the organic interlayer film composed of an organic film therebetween and having the plurality of slits therein, it is possible to configure a liquid crystal display of the FFS system. This makes it possible to configure a liquid crystal display having a wider viewing angle, as compared with the case where both pixel electrodes and a common electrode are formed with slits (openings) and the case where both pixel electrode and a common electrode are comb-like shaped as in an IPS (In Plane Switching) system.

In the liquid crystal display of the embodiment, preferably, the organic interlayer film formed between the common electrode and the pixel electrodes has a single layer. This makes it possible to simplify the device configuration and the manufacturing process of the display, as compared with the case where a stacked film is formed between the common electrode and the pixel electrodes.

In the liquid crystal display of the embodiment, preferably, the display further includes an alignment film which is so formed as to cover the upper side of the common electrode and which has an organic film, and the alignment film having the organic film is so formed as to make contact with the organic interlayer film through the slits in the common electrode. This configuration ensures that, since both the alignment film and the organic interlayer film have an organic film, the adhesion between the organic interlayer film and the alignment film can be enhanced, as compared with the case where the alignment film is formed in contact with an inorganic film.

In the liquid crystal display of the embodiment, preferably, the display further includes thin film transistors formed over one of the first substrate and the second substrate, and the pixel electrode is formed over the thin film transistor without an organic film therebetween and with an inorganic film therebetween. This makes it possible to simplify the structure and the manufacturing process of the display, as compared with a structure wherein the pixel electrode is formed over the thin film transistor, with both an inorganic film and an organic film therebetween.

In this case, preferably, the inorganic film covering the thin film transistors is formed in a surface shape on which outer shapes of the thin film transistors are reflected, those parts of the pixel electrodes covering the inorganic film which correspond to the thin film transistors are also formed in a shape on which the outer shapes of the thin film transistors are reflected, and a surface of the organic interlayer film covering the pixel electrodes is formed in a flat surface shape in a display region of each of the pixels. This configuration ensures that, since the surface of the organic interlayer film in the display region of each of the pixels is formed in a flat surface shape, the common electrode provided on the surface of the organic interlayer film can be formed in a flat surface shape.

In the liquid crystal display wherein the pixel electrode is formed over the thin film transistor with the inorganic film therebetween as above-mentioned, the inorganic film may have a silicon nitride film.

In the liquid crystal display of the embodiment, preferably, the organic interlayer film formed between the common electrode and the pixel electrodes has an acrylic resin. This makes it possible to easily form the organic interlayer film between the common electrode and the pixel electrodes by a coating method.

In the liquid crystal display of the embodiment, preferably, the organic interlayer film formed between the common electrode and the pixel electrodes has a photosensitive film. This permits the organic interlayer film to be easily formed between the common electrode and the pixel electrodes by a photolithography technique.

In the liquid crystal display of the embodiment, preferably, the display further includes thin film transistors formed over one of the first substrate and the second substrate, and source lines connected to the thin film transistors; and the plurality of slits in the common electrode are so formed as to extend in an oblique direction inclined at a predetermined angle relative to the direction in which the source lines extend. This makes it possible to configure a liquid crystal display of a single domain type in which the liquid crystal is aligned in a single direction.

In the liquid crystal display of the embodiment, preferably, the plurality of slits in the common electrode are formed in a V shape in plan view. This makes it possible to configure a liquid crystal display of a multi-domain type in which the liquid crystal is aligned in two directions. Accordingly, the viewing angle can be enlarged.

In the liquid crystal display of the embodiment, preferably, the display further includes thin film transistors formed over one of the first substrate and the second substrate, and source lines connected to the thin film transistors; and the plurality of slits in the common electrodes are so formed as to extend in a direction substantially orthogonal to the direction in which the source lines extend in plan view. This, also, makes it possible to configure a liquid crystal display of the single domain type in which the liquid crystal is aligned in a single direction.

In the liquid crystal display of the embodiment, preferably, the display further includes thin film transistors formed over one of the first substrate and the second substrate, and source lines connected to the thin film transistors; and the plurality of slits in the common electrode are so formed as to extend in a direction substantially parallel to the direction in which the source lines extend in plan view. This, also, makes it possible to configure a liquid crystal display of the single domain type in which the liquid crystal is aligned in a single direction.

In the liquid crystal display of the embodiment, preferably, the organic interlayer film is formed in a display section including the plurality of pixels and is formed also in a region on an outer side relative to a peripheral area of the display section, in plan view. This configuration ensures that, even if the organic interlayer film is somewhat misaligned relative to the display section forming region in forming the organic interlayer film in the display section, the organic interlayer film can be assuredly formed in the display section forming region, since the organic interlayer film is formed also in the region on the outer side of the peripheral area of the display section forming region.

In the liquid crystal display of the embodiment, preferably, the pixel electrode is so disposed as to overlap with the slit portion and other portion than the slit of the common electrode, in plan view. This makes it possible to configure a liquid crystal display of the FFS system wherein a horizontal electric field is generated between the pixel electrode and the common electrode which are located in an upper-lower relationship, unlike in the IPS system wherein a horizontal electric field is generated between the pixel electrode and the common electrode which are located on the same plane.

Additional features and advantages are described herein, and will be apparent from the following Detailed Description and the figures.

DETAILED DESCRIPTION

Figure 1:
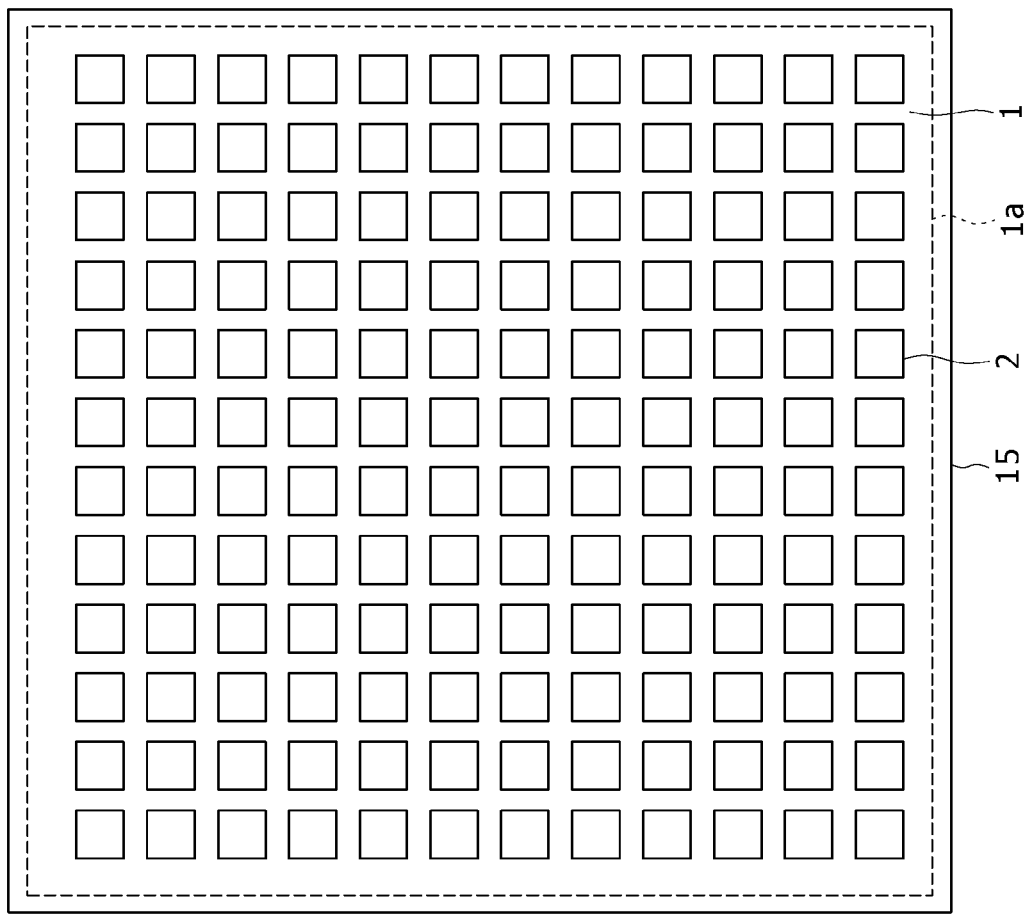
FIG. 1 is a plan view of a liquid crystal display (display section) according to a first embodiment.

Embodiments will be described below referring to the drawings.

[First Embodiment]

Figure 2:
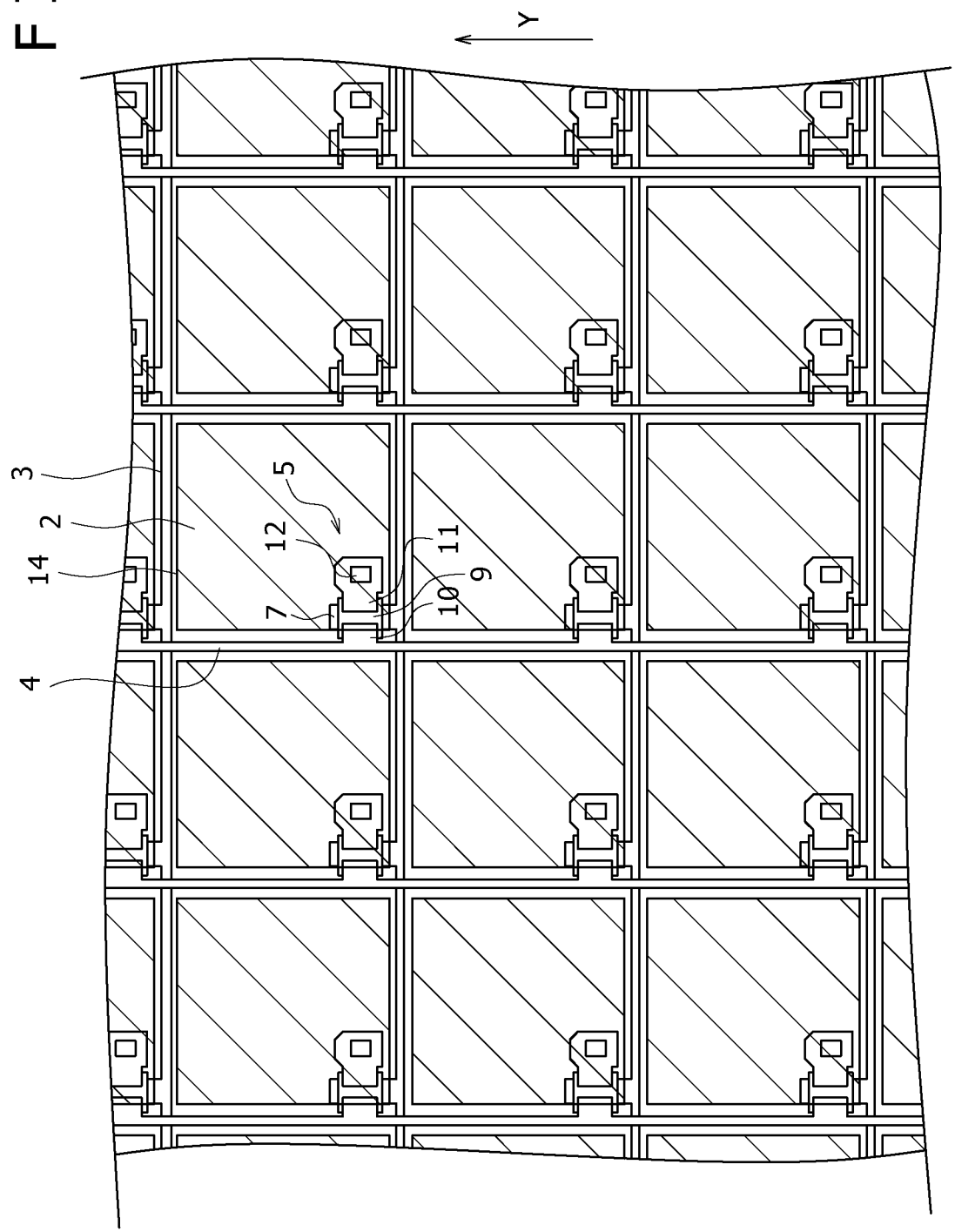
FIG. 2 illustrates the shape of pixel electrodes in the liquid crystal display (display section) according to the first embodiment.
Figure 3:
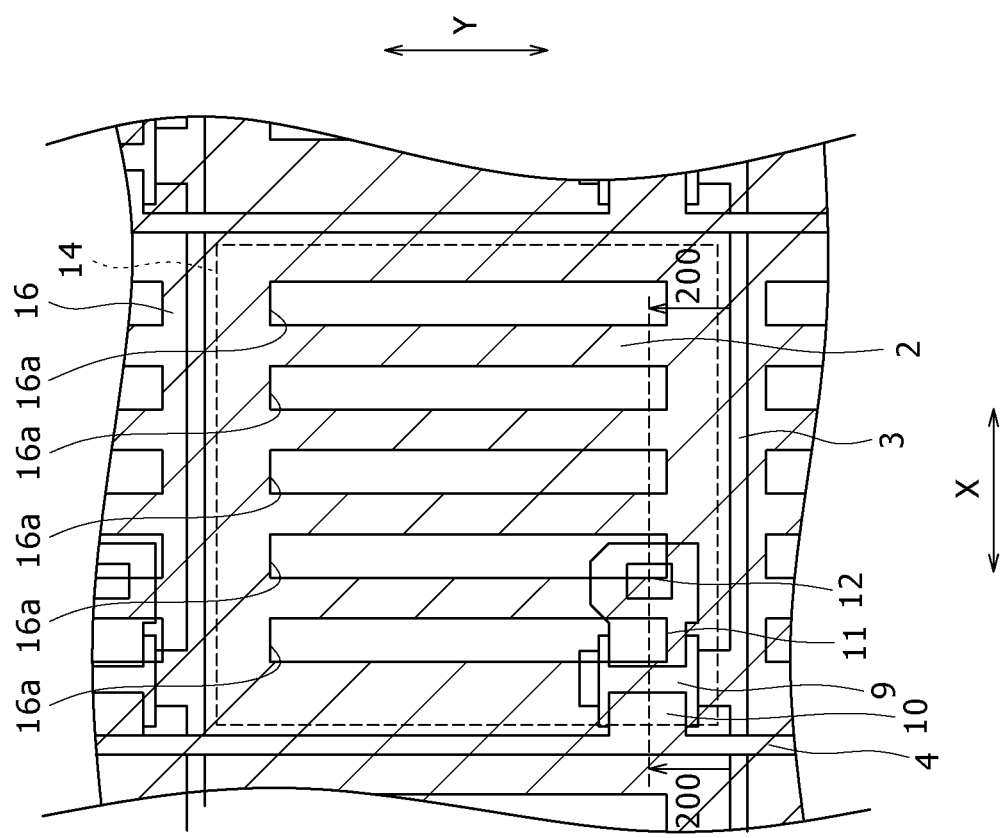
FIG. 3 illustrates the shape of a common electrode in the liquid crystal display (display section) according to the first embodiment.
Figure 4:
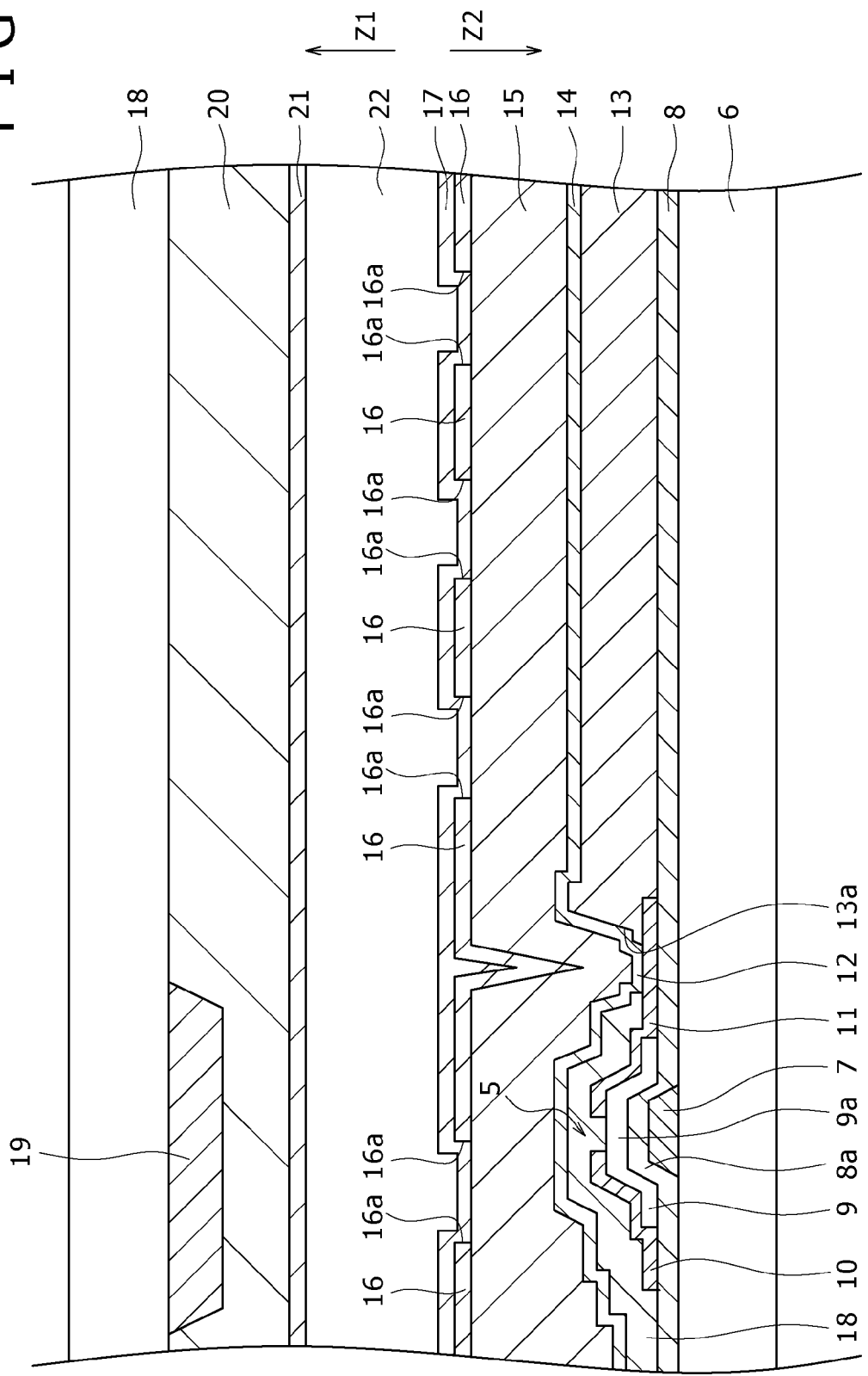
FIG. 4 is a sectional view of a pixel in the liquid crystal display (display section) according to the first embodiment.

FIG. 1 is a plan view of a liquid crystal display (display section) according to a first embodiment. FIG. 2 illustrates the shape of pixel electrodes in the liquid crystal display (display section) according to the first embodiment. FIG. 3 illustrates the shape of a common electrode in the liquid crystal display (display section) according to the first embodiment. FIG. 4 is a sectional view of a pixel according to the first embodiment. Referring to FIGS. 1 to 4, the configuration of a liquid crystal display 100 according to the first embodiment will be described.

In the liquid crystal display 100 according to the first embodiment, as shown in FIG. 1, a display section 1 is composed of a plurality of pixels 2 arranged in a matrix pattern. In addition, as shown in FIG. 2, the plurality of pixels 2 are provided respectively at positions where gate lines 3 and source lines 4 intersect. All the plurality of pixels 2 have an identical rectangular shape. Incidentally, the pixel 2 is so configured as to be driven by the FFS (Fringe Field Switching) system in which a horizontal electric field is generated between a pixel electrode 14 and a common electrode 16 located in an upper-lower relationship as will be described later. The plurality of pixels 2 are each provided with a thin film transistor (TFT) 5 of the bottom gate type.

As for a sectional structure of the pixel 2, a gate electrode 7 is provided on a glass substrate 6, as shown in FIG. 4. Incidentally, the glass substrate 6 is one example of the "first substrate" in the present embodiment. As shown in FIG. 2, the gate electrode 7 projects from the gate line 3 in the direction of arrow Y (the direction in which the source lines 4 extend) and is formed in a rectangular shape elongated in the direction of arrow Y, in plan view. As shown in FIG. 4, an insulation film 8 including a gate insulating film 8*a* composed of an SiN film or $SiO_2$ film is formed on the gate electrode 7 and on the glass substrate 6. A semiconductor layer 9 having a two-layer structure composed of an a-Si layer as a lower layer and an $n^+$ Si layer of n-type conductivity as an upper layer is formed so as to overlap with the gate electrode 7 in plan view, with the gate insulating film 8*a* therebetween.

A source electrode 10 and a drain electrode 11 are formed over the semiconductor layer 9 so as to overlap with the gate electrode 7 and the semiconductor layer 9 in plan view. In addition, in that region of the semiconductor layer 9 located between the source electrode 10 and the drain electrode 11, the n+ Si layer as the upper layer is removed, leaving the a-Si layer as the lower layer, whereby a channel region 9a is formed.

Besides, as shown in FIG. 2, the source electrode 10 of the thin film transistor 5 is electrically connected to the source line 4. In addition, the drain electrode 11 is electrically connected to a pixel electrode 14 (described later) through a contact portion 12.

As shown in FIG. 4, an interlayer insulation film 13 composed of an SiN film (silicon nitride film) is formed so as to cover the source electrode 10, the drain electrode 11 and the insulation film 8. Incidentally, the interlayer insulation film 13 is one example of the "inorganic film" in the present invention. Besides, in the first embodiment, the interlayer insulation film 13 is formed in a mountain-like surface shape on which the mountain-like outer shape of the thin film transistor 5 is reflected. The interlayer insulation film 13 is formed with a contact hole 13a. On the surface of the interlayer insulation film 13 composed of the SiN film, there is formed the pixel electrode 14.

In addition, in the first embodiment, as shown in FIG. 2, the pixel electrodes 14 are provided on the basis of each pixel 2 in the display section 1, and is formed over substantially the whole region of each pixel 2 so as not to have any slit or opening therein in plan view. As shown in FIG. 4, that portion of the pixel electrode 14 corresponding to the thin film transistor 5 is also formed in a shape on which the mountain-like outer shape of the thin film transistor 5 is reflected. Incidentally, a part of the pixel electrode 14 is electrically connected to the drain electrode 11 at the contact portion 12, through the contact hole 13a.

Besides, in the first embodiment, on the surface of the pixel electrode 14 is formed an organic interlayer film 15 as a single layer composed of a photosensitive acrylic resin. The surface of the organic interlayer film 15 is formed in a flat surface shape in the display region of each pixel 2. Specifically, the surface of the organic interlayer film 15 on the side of arrow Z1 is formed in a flat surface shape. On the other hand, the surface of the organic interlayer film 15 on the side of arrow Z2 is formed in a surface shape on which the mountain-like outer shape of the thin film transistor 5 is reflected. In addition, as shown in FIG. 1, the organic interlayer film 15 is formed in the display section 1 including the plurality of pixels 2 and is also formed in a region on the outer side relative to a peripheral area 1a of the display section 1, in plan view. Besides, as shown in FIG. 4, a common electrode 16 is formed on the surface of the organic interlayer film 15. Thus, the pixel electrodes 14 and the common electrode 16 are disposed on the side of the glass substrate 6 on which the thin film transistors 5 are formed.

In addition, in the first embodiment, as shown in FIG. 3, the common electrode 16 is formed with a plurality of slits 16a (openings). The plurality of slits 16a in the common electrode 16 are formed so as to extend in a direction substantially parallel to the direction (Y-direction) in which the source lines 4 extend, in plan view. A plurality of the slits 16a are provided and at a predetermined interval along the X-direction. Besides, as shown in FIG. 4, the portions of the slits 16a and other portions than the slits 16a, of the common electrode 16, are so disposed as to overlap with the pixel electrode 14.

In addition, in the first embodiment, an alignment film 17 composed of an organic film of polyimide or the like is formed on the surface of the common electrode 16. The alignment film 17 composed of an organic film is so formed as to cover the upper surface of the common electrode 16 and is so formed as to make contact with the organic interlayer film 15 (composed of an organic film) through the slits 16a in the common electrode 16.

As shown in FIG. 4, a glass substrate 18 is provided opposite to the glass substrate 6. The glass substrate 18 is one example of the "second substrate" in the present invention. A black matrix 19 is formed on a surface of the glass substrate 18. On surfaces of the glass substrate 18 and the black matrix 19, there is formed an overcoat 20 as a protective film. On a surface of the overcoat 20 is formed an alignment film 21 composed of an organic film of polyimide or the like. A liquid crystal layer 22 is sealed between the alignment film 17 and the alignment film 21.

In the first embodiment, as above-mentioned, the common electrode 16 is provided which is formed over the pixel electrodes 14, with the organic interlayer film 15 composed of an organic film therebetween, and which has the plurality of slits 16a. This ensures that, where the organic interlayer film 15 is formed between the common electrode 16 and the pixel electrodes 14 on the glass substrate 6, warping of the glass substrate 6 is suppressed because the tension on the organic interlayer film 15 is less than that on an inorganic film. As a result, it is possible to contrive suppression of the warping of the substrate in the liquid crystal display 100. In addition, by providing the pixel electrodes 14, the organic interlayer film 15 composed of an organic film, and the common electrode 16 over the glass substrate 6, it is possible to configure a liquid crystal display 100 of the FFS (Fringe Field Switching) system. Consequently, it is possible to configure a liquid crystal display 100 with a greater viewing angle, as compared with the case where both the pixel electrodes 14 and the common electrode 16 are formed with slits 16a (openings) and the case where both the pixel electrodes 14 and the common electrode 16 are comb-like shaped as in the IPS (In Plane Switching) system.

Besides, in the first embodiment, as above-mentioned, the organic interlayer film 15 formed between the common electrode 16 and the pixel electrodes 14 is composed of a single layer, whereby it is possible to simplify the device configuration and the manufacturing process of the display, as compared with the case where a stacked layer is formed between the common electrode 16 and the pixel electrodes 14.

In addition, in the first embodiment, as above-mentioned, the alignment film 17 composed of an organic film is formed so as to make contact with the organic interlayer film 15 through the slits 16a in the common electrode 16. This ensures that, since the alignment film 17 and the organic interlayer film 15 are each formed of an organic film, adhesion between the organic interlayer film 15 and the alignment film 17 can be enhanced, as compared with the case where the alignment film 17 is so formed as to make contact with an inorganic film.

Besides, in the first embodiment, as above-mentioned, the pixel electrodes 14 are formed over the thin film transistors 5 without any organic film therebetween and with the interlayer insulation film 13 therebetween. This makes it possible to simplify the structure and the manufacturing process of the display, as compared with the structure in which the pixel electrodes 14 are formed over the thin film transistors 5 with both an inorganic film and an organic film therebetween.

In addition, in the first embodiment, as above-mentioned, the surface of the organic interlayer film 15 covering the pixel electrodes 14 is formed in a flat surface shape in the display region of each pixel 2. Accordingly, the common electrode 16 provided on the surface of the organic interlayer film 15 can be formed in a flat surface shape.

Besides, in the first embodiment, as above-mentioned, the organic interlayer film 15 formed between the common electrode 16 and the pixel electrodes 14 is composed of an acrylic resin. This permits the organic interlayer film 15 to be easily formed between the common electrode 16 and the pixel electrodes 14 by a coating method.

In addition, in the first embodiment, as above-mentioned, the organic interlayer film 15 formed between the common electrode 16 and the pixel electrodes 14 is composed of a photosensitive film. Consequently, the organic interlayer film 15 can be easily formed between the common electrode 16 and the pixel electrode 14 by a photolithography technique.

Besides, in the first embodiment, as above-mentioned, the plurality of slits 16a in the common electrode 16 are formed to extend in a direction (Y-direction) substantially parallel to the direction in which the source lines 4 extend, in plan view. Consequently, it is possible to configure a liquid crystal display of a single domain type in which the liquid crystal layer 22 is aligned in a single direction.

In addition, in the first embodiment, as above-mentioned, the organic interlayer film 15 is formed in the display section 1 inclusive of the plurality of pixels 2 and is formed also in a region on the outer side relative to the peripheral area 1a of the display section 1, in plan view. This ensures that, even if the organic interlayer film 15 is somewhat deviated relative to the formation region of the display section 1 in forming the organic interlayer film 15 in the display section 1, the organic interlayer film 15 can be formed assuredly in the formation region of the display section 1, since the organic interlayer film 15 is formed also in the area on the outer side of the formation region of the display section 1.

Besides, in the first embodiment, as above-mentioned, the pixel electrodes 14 are so disposed as to overlap with the portions of the slits 16a and also with other portions than the slits 16a, of the common electrode 16, in plan view. This makes it possible to configure a liquid crystal display 100 of the FFS system in which a horizontal electric field is generated between the pixel electrode 14 and the common electrode 16 which are located in an upper-lower relationship, unlike in the IPS system in which a horizontal electric field is generated between the pixel electrode 14 and the common electrode 16 which are located on the same plane.

[Second Embodiment]

Figure 5:
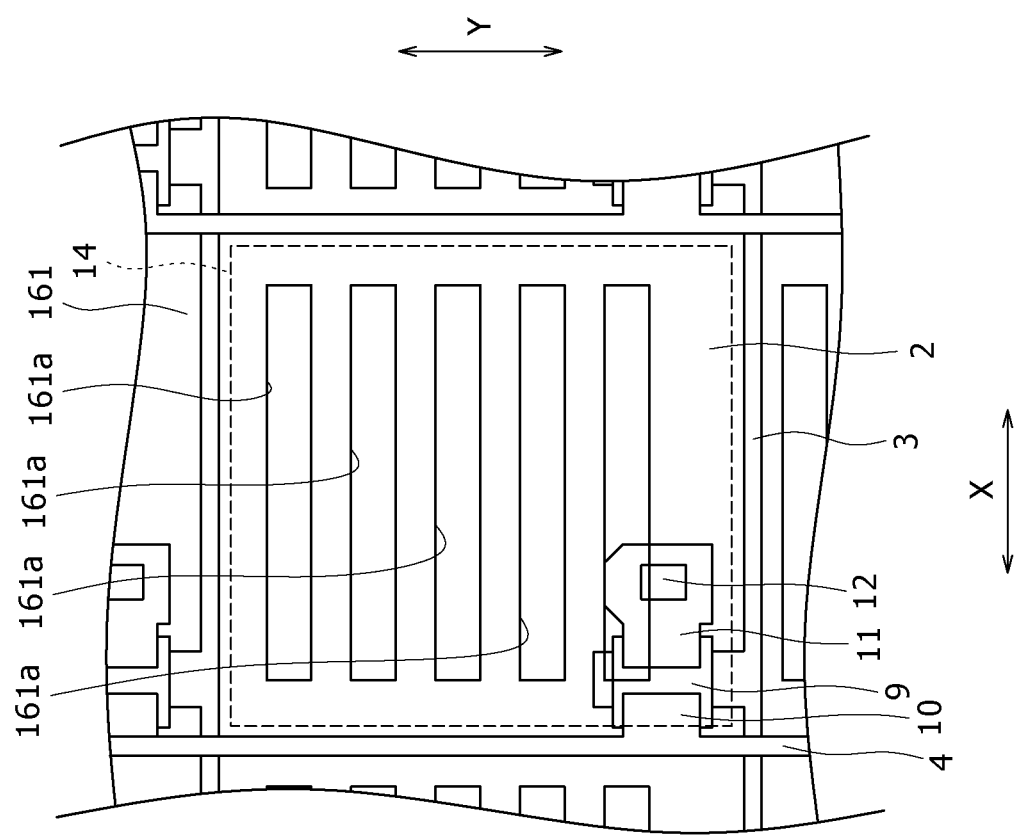
FIG. 5 is a plan view of a liquid crystal display (display section) according to a second embodiment.

FIG. 5 is a plan view of a liquid crystal display (display section) according to a second embodiment. Referring to FIG. 5, in the liquid crystal display 100 according to the second embodiment, slits 161a in a common electrode 161 are formed in a direction different from that in the above-described first embodiment, as follows.

In the liquid crystal display 100 of the second embodiment, as shown in FIG. 5, the plurality of slits 161a in the common electrode 161 are formed to extend in a direction (X-direction) substantially orthogonal to the direction (Y-direction) in which source lines 4 extend, in plan view. A plurality of the slits 161a are provided at an interval along the Y-direction. Besides, the portions of the slits 161a and other portions than the slits 161a, of the common electrode 161, are disposed to overlap with pixel electrodes 14.

Incidentally, the other configurations of the second embodiment are the same as those of the first embodiment above.

In the second embodiment, as above-mentioned, the plurality of slits 161a in the common electrode 161 are formed so as to extend in the direction (X-direction) substantially orthogonal to the direction in which the source lines 4 extend, in plan view. This makes it possible to configure a liquid crystal display 100 of the single domain type in which a liquid crystal layer 22 is aligned in a single direction.

In addition, the other effects of the second embodiment are the same as those of the above-described first embodiment.

[Third Embodiment]

Figure 6:
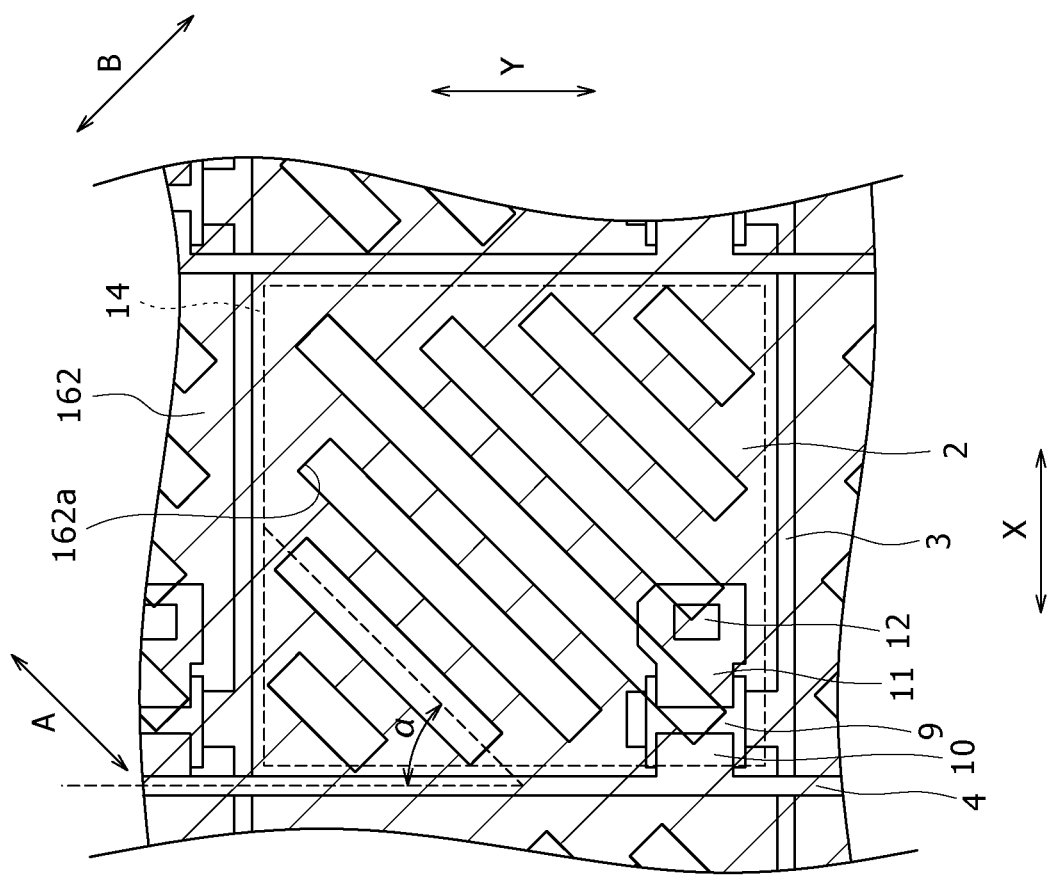
FIG. 6 is a plan view of a liquid crystal display (display section) according to a third embodiment.

FIG. 6 is a plan view of a liquid crystal display (display section) according to a third embodiment. Referring to FIG. 6, in the liquid crystal display 100 according to the third embodiment, slits 162a in a common electrode 162 are formed in a direction different from that in the above-described first embodiment, as follows.

In the liquid crystal display 100 according to the third embodiment, as shown in FIG. 6, the plurality of slits 162a in the common electrode 162 are formed to extend in an oblique direction (A-direction) inclined at a predetermined angle α (about 45 degrees) relative to the direction (Y-direction) in which source lines 4 extend, in plan view. A plurality of the slits 162a are provided at an interval along a B-direction. In addition, the portions of the slits 162a and other portions than the slits 162a, of the common electrode 162, are so disposed as to overlap with pixel electrodes 14.

Incidentally, the other configurations of the third embodiment are the same as those in the first embodiment above.

In the third embodiment, as above-mentioned, the plurality of slits 162a in the common electrode 162 are formed so as to extend in the oblique direction (A-direction) inclined at the predetermined angle α (45 degrees) relative to the direction in which the source lines 4 extend, in plan view. This makes it possible to configure a liquid crystal display 100 of the single domain type in which the liquid crystal in a liquid crystal layer 22 is aligned in a single direction.

In addition, the other effects of the third embodiment are the same as those of the first embodiment above.

[Fourth Embodiment]

Figure 7:
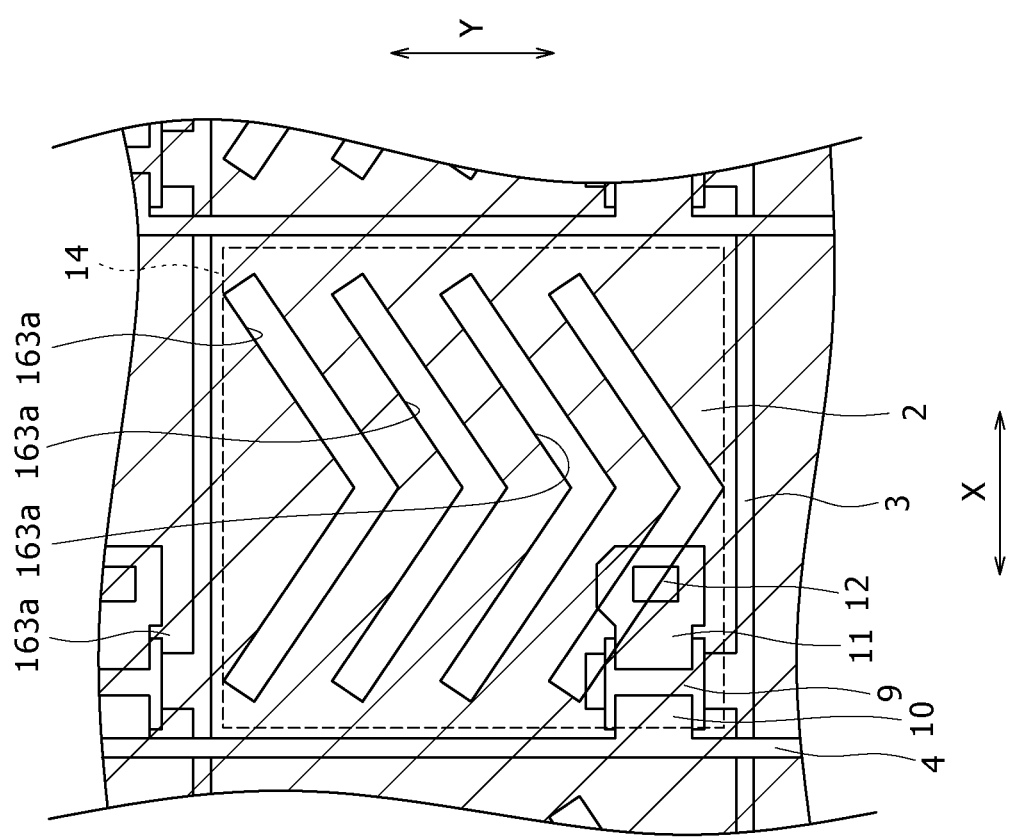
FIG. 7 is a plan view of a liquid crystal display (display section) according to a fourth embodiment.

FIG. 7 is a plan view of a liquid crystal display (display section) according to a fourth embodiment. Referring to FIG. 7, in the liquid crystal display 100 of the fourth embodiment, slits 163a in a common electrode 163 are formed in a direction different from that in the above-described first embodiment, as follows.

In the liquid crystal display 100 according to the fourth embodiment, as shown in FIG. 7, the plurality of slits 163a in the common electrode 163 are formed in a V shape in plan view. A plurality of the V-shaped slits 163a are provided at an interval along a Y-direction. Besides, the portions of the slits 163a and other portions than the slits 163a, of the common electrode 163, are so disposed as to overlap with pixel electrodes 14.

Incidentally, the other configurations of the fourth embodiments are the same as those of the first embodiment above.

In the fourth embodiment, as above-mentioned, the plurality of slits 163a in the common electrode 163 are formed in the V shape in plan view. This makes it possible to configure a liquid crystal display 100 of a multi-domain type in which a liquid crystal layer 22 is aligned in two directions. Accordingly, the viewing angle can be widened.

Besides, the other effects of the fourth embodiment are the same as those of the first embodiments above.

[Fifth Embodiment]

Figure 8:
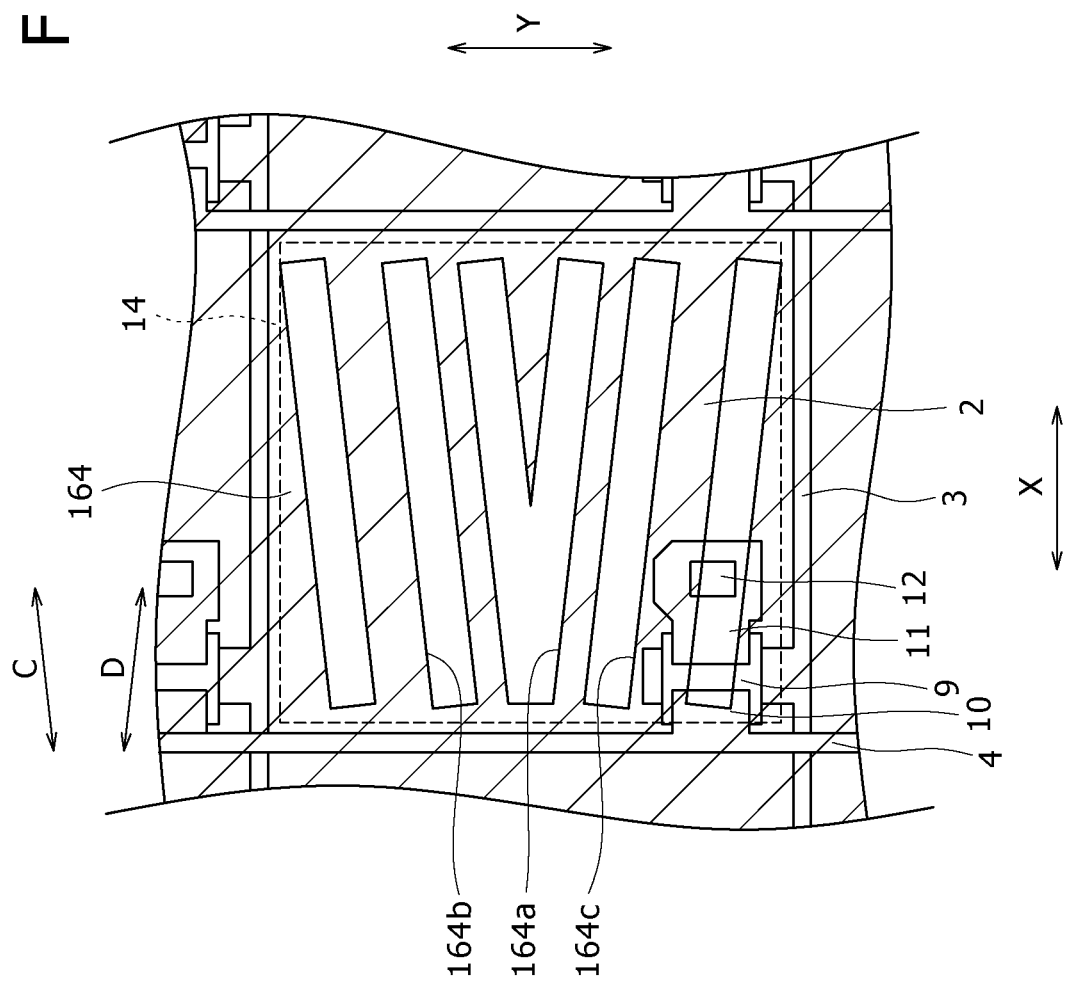
FIG. 8 is a plan view of a liquid crystal display (display section) according to a fifth embodiment.

FIG. 8 is a plan view of a liquid crystal display (display section) according to a fifth embodiment. Referring to FIG. 8, in the liquid crystal display 100 of the fifth embodiment, slits 164a in a common electrode 164 are formed in a direction different from that in the above-described first embodiment, as follows.

In the liquid crystal display 100 according to the fifth embodiment, as shown in FIG. 8, the common electrode 164 is provided therein with the slits 164a which are V-shaped, slits 164b which are formed to extend along a C-direction, and slits 164c which are formed to extend in a D-direction, in plan view. Specifically, the V-shaped slits 164a are provided one in each pixel 2, whereas a plurality of the slits 164b and a plurality of the slits 164c are provided in each pixel 2. In addition, the portions of the slits 164a to 164c and other portions than the slits 164a to 164c, of the common electrode 164, are so disposed as to overlap with pixel electrodes 14.

Incidentally, the other configurations of the fifth embodiment are the same as those of the first embodiment above.

Besides, the effects of the fifth embodiment are the same as those of the first embodiment above.

Incidentally, the embodiments disclosed herein are considered to be illustrative in all features and not to be limitative.

While an example in which the organic interlayer film 15 is formed from an acrylic resin has been shown in the first to fifth embodiments above, the present invention is not limited to this configuration. The organic interlayer film 15 may be formed from other material than acrylic resin.

In addition, while an example in which the organic interlayer film as a single layer is provided between the common electrode and the pixel electrodes has been shown in the first to fifth embodiments above, the present invention is not limited to this configuration. An organic interlayer film composed of two or more layers stacked on each other may be formed between the common electrode and the pixel electrodes.

Besides, while an example in which the pixel electrodes and the common electrode are formed on the side of the glass substrate 6 has been shown in the first to fifth embodiments above, it is not limited to this configuration. The pixel electrodes and the common electrode may be formed on the side of the glass substrate 18.

Further, while examples of arrangement of the slits in the common electrode have been shown in the first to fifth embodiments above, the first to fifth embodiments above may be combined with each other.

In addition, while an example in which the pixel electrodes are formed on an inorganic film (SiN film) has been shown in the first to fifth embodiments above, the organic interlayer film having a flat upper surface may be formed also between the inorganic film (SiN film) and the pixel electrodes.

Besides, while an example in which the plurality of slits in the common electrode are formed at an inclination of 45 degrees relative to the Y-direction in plan view has been shown in the third embodiment above, the inclination angle is not limited to 45 degrees, insofar as the slits are inclined relative to the Y-direction.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display comprising:
 a display section including a plurality of pixels;
 a first substrate and a second substrate which are disposed opposite to each other with liquid crystal therebetween in the display section;
 a thin film transistor formed for each pixel;
 an inorganic film formed to cover the thin film transistor, the inorganic film having a surface shape on which an outer shape of the thin film transistor is reflected;
 a pixel electrode formed on the inorganic film to cover substantially a whole region of the pixel including an area corresponding to the thin film transistor, the pixel electrode having no slit or opening in plan view and having a surface shape on which an outer shape of the thin film transistor is reflected in the area corresponding to the thin film transistor;
 an organic interlayer film formed in a single layer to cover the pixel electrodes, the organic interlayer film having a flat surface shape;
 a common electrode formed over the pixel electrodes, with the organic interlayer film therebetween, the common electrode having a plurality of slits; and
 an alignment film formed of an organic film to cover the common electrode, and configured to make contact with the organic interlayer film through the slits in the common electrode.

2. The liquid crystal display according to claim 1, wherein the inorganic film has a silicon nitride film.

3. The liquid crystal display according to claim 1, wherein the organic interlayer film formed between the common electrode and the pixel electrodes has an acrylic resin.

4. The liquid crystal display according to claim 1, wherein the organic interlayer film formed between the common electrode and the pixel electrodes has a photosensitive film.

5. The liquid crystal display according to claim 1, further comprising:
 thin film transistors formed over one of the first substrate and the second substrate; and
 source lines connected to the thin film transistors;
 wherein the plurality of slits in the common electrode are so formed as to extend in an oblique direction inclined at a predetermined angle relative to the direction in which the source lines extend.

6. The liquid crystal display according to claim 1, wherein the plurality of slits in the common electrode are formed in a V shape in plan view.

7. The liquid crystal display according to claim 1, further comprising:
 thin film transistors formed over one of the first substrate and the second substrate; and
 source lines connected to the thin film transistors;
 wherein the plurality of slits in the common electrodes are so formed as to extend in a direction substantially orthogonal to the direction in which the source lines extend in plan view.

8. The liquid crystal display according to claim 1, further comprising:
 thin film transistors formed over one of the first substrate and the second substrate; and
 source lines connected to the thin film transistors;
 wherein the plurality of slits in the common electrode are so formed as to extend in a direction substantially parallel to the direction in which the source lines extend in plan view.

9. The liquid crystal display according to claim 1, wherein the organic interlayer film is formed in a display section including the plurality of pixels and is formed also in a region on an outer side relative to a peripheral area of the display section, in plan view.

10. The liquid crystal display according to claim 1, wherein the pixel electrode is so disposed as to overlap with the slit portion and other portion than the slit of the common electrode, in plan view.

* * * * *